United States Patent
Ford

(10) Patent No.: US 12,195,132 B2
(45) Date of Patent: Jan. 14, 2025

(54) STEERING DAMPER BRACKETS FOR THREE-WHEEL MOTORCYCLE

(71) Applicant: Richard Ford, Brasleton, GA (US)

(72) Inventor: Richard Ford, Brasleton, GA (US)

(*) Notice: Subject to any disclaimer, the term of this patent is extended or adjusted under 35 U.S.C. 154(b) by 28 days.

(21) Appl. No.: 18/224,375

(22) Filed: Jul. 20, 2023

(65) Prior Publication Data

US 2024/0227975 A1 Jul. 11, 2024

Related U.S. Application Data

(60) Provisional application No. 63/474,154, filed on Jul. 21, 2022.

(51) Int. Cl.
| | | |
|---|---|---|
| *B62K 21/08* | (2006.01) | |
| *B62K 5/027* | (2013.01) | |
| *B62K 5/05* | (2013.01) | |
| *B62K 21/18* | (2006.01) | |

(52) U.S. Cl.
CPC .............. *B62K 21/08* (2013.01); *B62K 5/027* (2013.01); *B62K 5/05* (2013.01); *B62K 21/18* (2013.01)

(58) Field of Classification Search
CPC .......... B62K 21/08; B62K 5/027; B62K 5/05; B62K 21/18; B62K 5/08
See application file for complete search history.

(56) References Cited

U.S. PATENT DOCUMENTS

| | | | |
|---|---|---|---|
| 4,558,878 A * | 12/1985 | Motrenec | B62K 21/08 280/90 |
| 6,634,250 B2 | 10/2003 | Schroter et al. | |
| 7,591,337 B2 | 9/2009 | Suhre et al. | |
| 7,896,360 B2 | 3/2011 | Buma | |
| 8,162,341 B2 * | 4/2012 | Mori | B62K 21/08 280/90 |

(Continued)

FOREIGN PATENT DOCUMENTS

| | | |
|---|---|---|
| EP | 3 421 342 A1 | 1/2019 |
| EP | 3 162 680 B1 | 3/2019 |

(Continued)

OTHER PUBLICATIONS

Bent Rider: "Bentrider Store"; Jan. 2010.
Harley Davidson Forums; Mar. 2, 2018.

*Primary Examiner* — Paul N Dickson
*Assistant Examiner* — Tiffany L Webb
(74) *Attorney, Agent, or Firm* — Bryan W. Bockhop; Bockhop Intellectual Property Law, LLC

(57) ABSTRACT

A kit for reducing handlebar shake in a three-wheel motorcycle with dual front wheels, having a frame, a steering column and a connecting rod that couples the steering column to the dual front wheels, includes a linear steering stabilizer that includes a cylinder member and a piston rod. A portion of the piston rod fits slidingly in the cylinder member. The piston rod terminates in a connecting end. A body bracket is attached to the cylinder member. A first bracket is affixable to the frame and is affixable to the connecting end of the piston rod of the linear steering stabilizer. A second bracket is affixable to a selected one of the steering column or the connecting rod and is affixable to the body bracket attached to the cylinder member. The linear steering stabilizer is damps handlebar shake during operation of the three-wheel motorcycle.

20 Claims, 3 Drawing Sheets

(56) References Cited

U.S. PATENT DOCUMENTS

| | | | |
|---|---|---|---|
| 8,286,978 | B2 | 10/2012 | Marabese |
| 8,439,380 | B2 * | 5/2013 | Mori ................... B62K 21/08 |
| | | | 280/271 |
| 8,684,385 | B2 * | 4/2014 | Kuboyama ............ B62K 21/08 |
| | | | 280/271 |
| 9,150,240 | B2 | 10/2015 | Schnitzer et al. |
| 10,384,739 | B2 | 8/2019 | Marabese et al. |
| 10,981,619 | B2 * | 4/2021 | Mukai ..................... B62K 5/10 |
| 2002/0084619 | A1 | 7/2002 | Odom |
| 2005/0151341 | A1 * | 7/2005 | Iwamoto ................ F16F 9/512 |
| | | | 280/272 |
| 2014/0312580 | A1 | 10/2014 | Gale |
| 2023/0100207 | A1 | 3/2023 | Moroni et al. |

FOREIGN PATENT DOCUMENTS

| | | |
|---|---|---|
| JP | 2005-195121 A | 7/2005 |
| WO | WO 2020/225716 A1 | 11/2020 |

* cited by examiner

STEERING DAMPER BRACKETS FOR THREE-WHEEL MOTORCYCLE

CROSS-REFERENCE TO RELATED APPLICATION(S)

This application claims the benefit of U.S. Provisional Patent Application Ser. No. 63/474,154, filed Jul. 21, 2022, the entirety of which is hereby incorporated herein by reference.

BACKGROUND OF THE INVENTION

1. Field of the Invention

The present invention relates to devices of motor cycles and, more specifically, to a kit for reducing shimmy in three-wheeled motorcycles.

2. Description of the Related Art

Certain three-wheel motorcycles, such as the Ryker Can-Am model available from Bombardier Recreational Products, include two wheels in front and a single wheel in back. With such motorcycles, handlebars are coupled to a steering mechanism that manipulates the direction of the parallel two front wheels, while the rear wheel is held in a fixed relationship to the frame.

Some riders of such motorcycles have reported experiencing a certain amount of shake or shimmy in the handlebars while driving in certain conditions. Such an experience of shake can be unpleasant to some drivers.

Therefore, there is a need for a kit and method of reducing shake in a three-wheeled motorcycle.

SUMMARY OF THE INVENTION

The disadvantages of the prior art are overcome by the present invention which, in one aspect, is a kit for reducing handlebar shake in a three-wheel motorcycle with dual front wheels, having a frame, a steering column and a connecting rod that couples the steering column to the dual front wheels. A linear steering stabilizer includes a cylinder member and a piston rod. A portion of the piston rod fits slidingly in the cylinder member. The piston rod terminates in a connecting end. A body bracket is attached to the cylinder member. A first bracket is affixable to the frame and is affixable to the connecting end of the piston rod of the linear steering stabilizer. A second bracket is affixable to a selected one of the steering column or the connecting rod and is affixable to the body bracket attached to the cylinder member. The linear steering stabilizer damps handlebar shake during operation of the three-wheel motorcycle.

In another aspect, the invention is a three-wheel motorcycle with dual front wheels. The motor cycle includes a frame, a steering column and a connecting rod that couples the steering column to the dual front wheels. A linear steering stabilizer includes a cylinder member and a piston rod. A portion of the piston rod fits slidingly in the cylinder member. The piston rod terminates in a connecting end and a body bracket is attached to the cylinder member. A first bracket is affixed to the frame and is also affixed to the connecting end of the piston rod of the linear steering stabilizer. A second bracket is affixed to a selected one of the steering column or the connecting rod and is also affixed to the body bracket attached to the cylinder member. The linear steering stabilizer is configured to damp handlebar shake during operation of the three-wheel motorcycle.

In yet another aspect, the invention is a method of reducing handlebar shake in a three-wheel motorcycle with dual front wheels, having a frame, a steering column and a connecting rod that couples the steering column to the dual front wheels, in which a first bracket is affixed to the frame and a second bracket is affixed to a selected one of the steering column or the connecting rod. The first bracket is affixed to a connecting end of a piston rod of a linear steering stabilizer and the second bracket is affixed to a body bracket attached to the cylinder member of the linear steering stabilizer. The linear steering stabilizer damps handlebar shake during operation of the three-wheel motorcycle.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
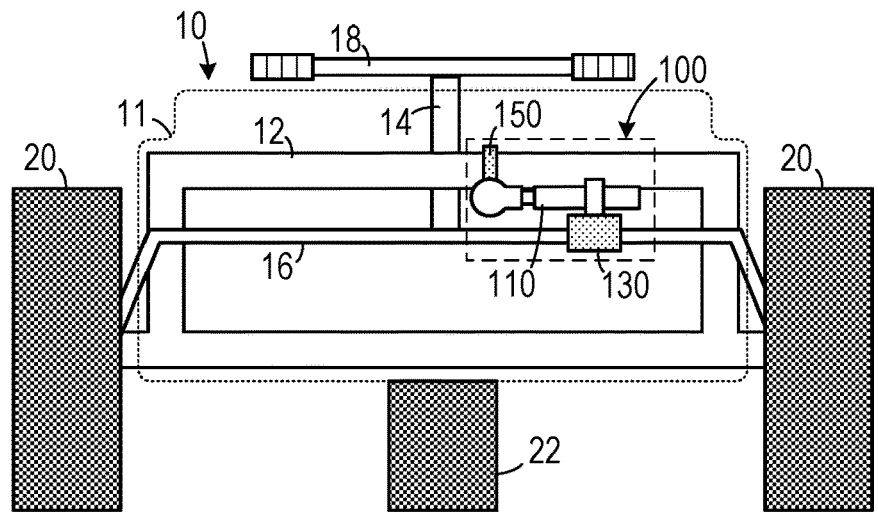
FIG. 1A is a front view schematic diagram of a three wheel motorcycle employing a connecting rod connected embodiment of a damping kit.
Figure 1B:
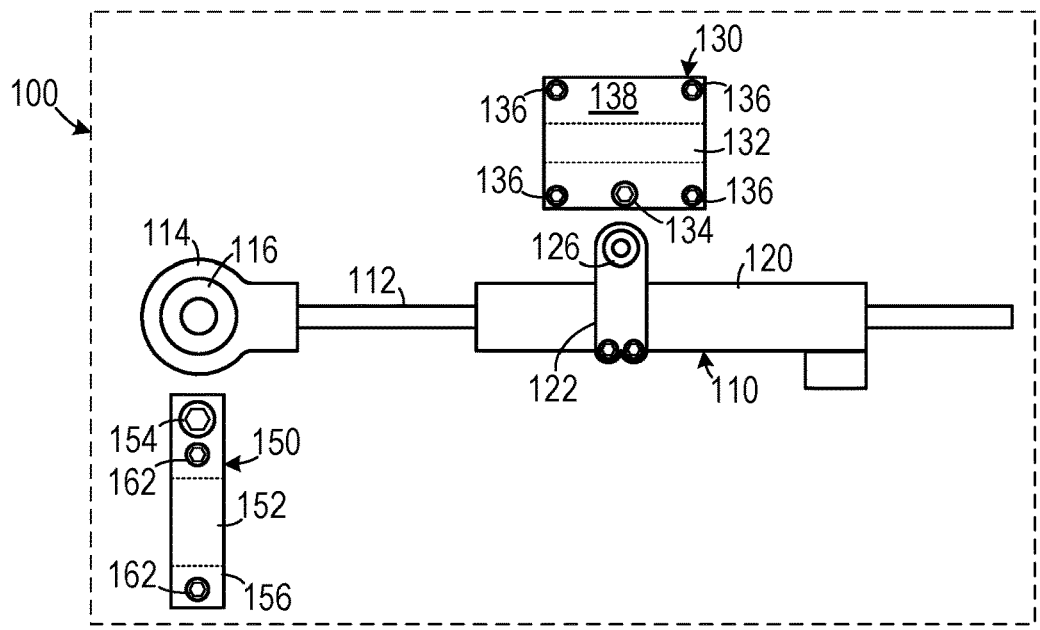
FIG. 1B is a schematic diagram of the kit shown in FIG. 1A.
Figure 1C:
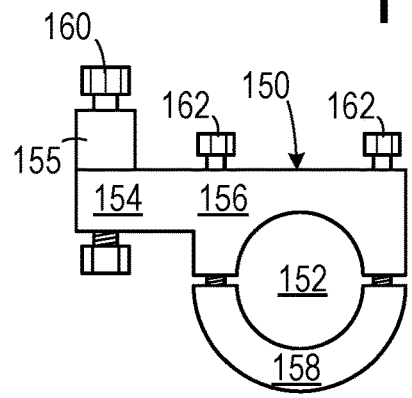
FIG. 1C is a side view of a frame connection bracket.
Figure 1D:
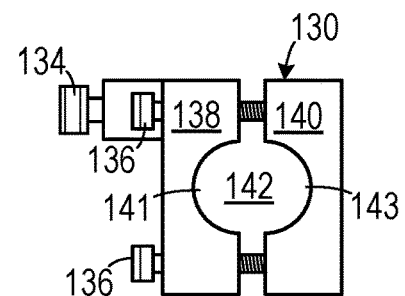
FIG. 1D is a side view of a connecting rod connection bracket.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-1D, one representative embodiment of a kit 100 for reducing shake in a three-wheeled motorcycle 10 includes a linear steering stabilizer 120, a first bracket 150 and a second bracket 130. The motorcycle 10 includes a frame 12 that supports a body 11, two front wheels 20, and a rear wheel 22. A steering column 14 conveys steering input from the handlebars 18 to a connecting rod 16, which is coupled to the front wheels 20.

The linear steering stabilizer 110 includes a cylinder member 120 and a piston rod 112. A portion of the piston rod 112 slides in the cylinder member 120, which provides damping resistance thereto. The piston rod 112 terminates in a connecting end 116 that has a gimbal structure 114 attachment. A body bracket 122 is attached to the cylinder member 120 and also has a gimbal structure 126 attachment. The linear steering stabilizer 110 damps handlebar shake during operation of the three-wheel motorcycle 10.

The first bracket 150 is configured to be affixed to the frame 12 and to the connecting end 114 of the piston rod 112 of the linear steering stabilizer 110. The first bracket 150 can include a P-shaped member 156 that has an elongated structure 154 that is coupled to a semi-circular structure 158 with a pair of screws 162. The P-shaped member 156 defines an opening 152 that is complementary in shape to the frame 12. The elongated structure 154 terminates in an end to which the connecting end 114 of the piston rod 112 is coupled with a screw 160 that fits in a hole defined by the gimbal structure 116. A spacer 155 may be provided as needed for correct fit.

Figure 3:
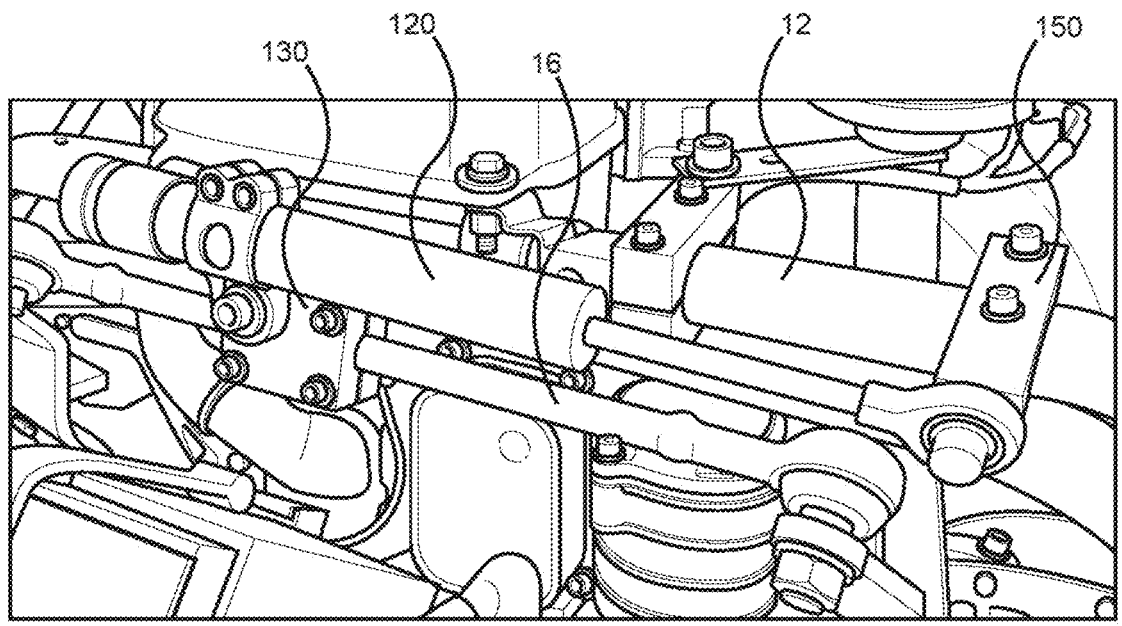
FIG. 3 is a photograph of an installed connecting rod embodiment.

The second bracket 130 is configured to be affixed to the connecting rod 16. The second bracket 130 includes a rectangular first plate 138 that defines a first semi-cylindrical channel 141 and an opposite rectangular second plate 140 that defines a second semi-cylindrical channel 143. The first semi-cylindrical channel 141 is aligned with the second semi-cylindrical channel 143 so as to form a cylindrical channel 142 that is complementary in shape to the exterior surface of the connecting rod 16 when the first plate 138 and the second plate 140 are affixed to each other. The second bracket 130 includes a screw 134 that is coupled to the body bracket 122 attached to the cylinder member 120. The first plate 138 is affixed to the second plate 140 with screws 136 at their corners so that if one of the four screws 136 fails, any remaining of the four screws 136 will maintain a coupling between the second bracket 130 and the connecting rod 16. This can be important because the rod 16 may be subjected to a great deal of motion, which may increase a likelihood of screw failure. A photograph of this embodiment is shown in FIG. 3.

Figure 2A:
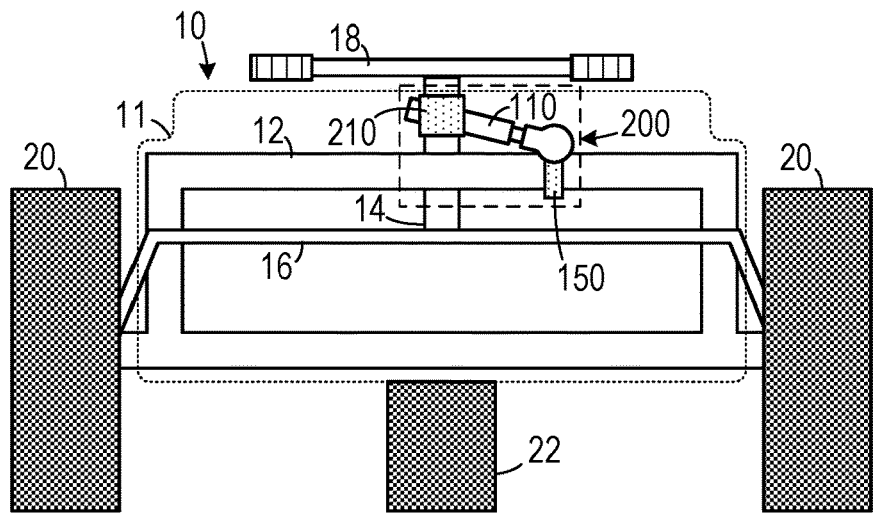
FIG. 2A is a front view schematic diagram of a three wheel motorcycle employing a steering column connected embodiment of a damping kit.
Figure 2B:
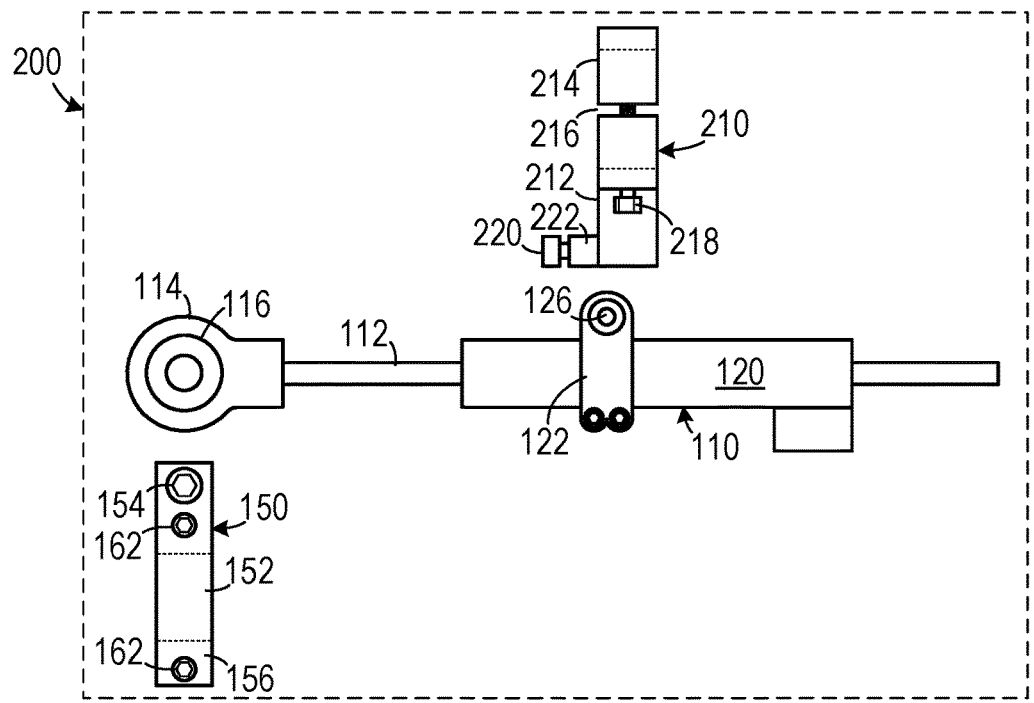
FIG. 2B is a schematic diagram of the kit shown in FIG. 2A.
Figure 2C:
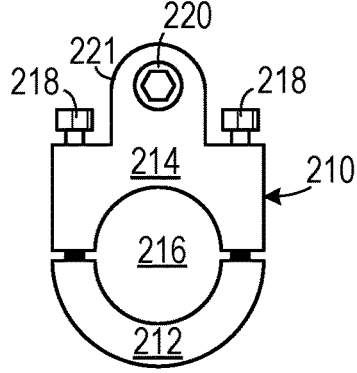
FIG. 2C is a side view of a steering column connection bracket.
Figure 4:
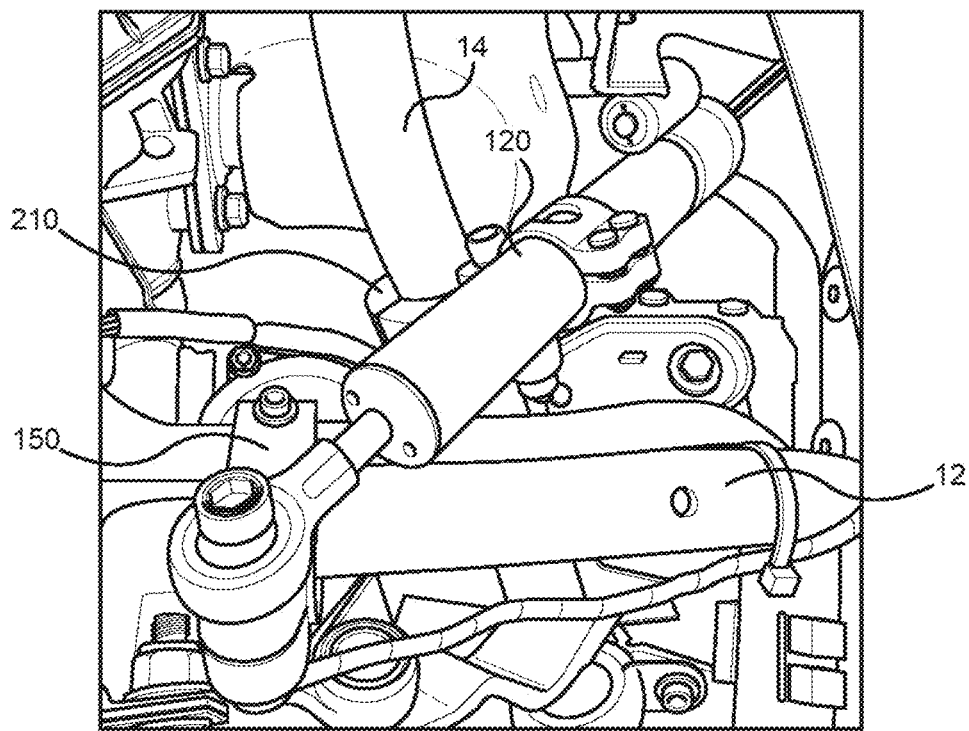
FIG. 4 is a photograph of an installed steering column embodiment.

In an alternate embodiment, as shown in FIGS. 2A-2C, the second bracket 210 is affixed to the steering column 14. In this embodiment, the second bracket 210 includes an inverted Y-shaped structure 214 that is coupled to a semi-circular structure 212 with a pair of screws 218. The Y-shaped structure 214 and the semi-circular structure 212 define an opening 216 that is complementary in shape to the exterior surface of the steering column 14 when placed together. The Y-shaped structure 214 includes an extension 221 that has a screw 220 for securing the second bracket 210 to the body bracket 122 attached to the cylinder member 120. A spacer 222 may be provided as needed for correct fit. A photograph of this embodiment is shown in FIG. 4.

To install the kit, in one embodiment, the first bracket 150 is affixed to the frame 12. The second bracket 130 or 220 is affixed to a selected one of the steering column 14 or the connecting rod 16 (depending on which of the above described embodiments is being employed). The first bracket 150 is affixed to connecting end 114 of a piston rod 112 of the linear steering stabilizer 110. Then, the second bracket is affixed to the body bracket 126 attached to cylinder member 120 of the linear steering stabilizer 110.

The stabilizer system of the present invention also eliminates handlebar pull away. This happens when a rider drives over hump at an angle, such as a speed bump or the entry to a driveway. In this situation, the outboard handlebar tends to pull away from the driver. This can also have a similar effect on the motorcycle on rough roads, which can induce a drifty unsettling feeling. Use of the present invention prevents such pull away events. Also, the system of the present invention is effective for motorcycles without power steering.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A kit for reducing handlebar shake in a three-wheel motorcycle with dual front wheels, having a frame, a steering column and a connecting rod that couples the steering column to the dual front wheels, the kit comprising:
   (a) a linear steering stabilizer that includes a cylinder member and a piston rod, a portion of which fits slidingly in the cylinder member, in which the piston rod terminates in a connecting end, a body bracket being attached to the cylinder member;
   (b) a first bracket that is affixable to the frame and that is affixable to the connecting end of the piston rod of the linear steering stabilizer; and
   (c) a second bracket that is affixable to a selected one of the steering column or the connecting rod and that is affixable to the body bracket attached to the cylinder member,
   wherein the linear steering stabilizer is configured to damp handlebar shake during operation of the three-wheel motorcycle.

2. The kit of claim 1, wherein the first bracket comprises a P-shaped member, the P-shaped member including an elongated structure that is coupled to a semi-circular structure with a pair of screws, the P-shaped member defining an opening that is complementary in shape to the frame therethrough, the elongated structure terminating in an end that is configured to be coupled to the connecting end of the piston rod with a screw.

3. The kit of claim 1, wherein the second bracket comprises a first plate defining a first semi-cylindrical channel and an opposite second plate defining a second semi-cylindrical channel aligned with the first semi-cylindrical channel so that the first semi-cylindrical channel and the second semi-cylindrical channel form a cylindrical channel that is complementary in shape to the connecting rod when the first plate and the second plate are affixed to each other, the second bracket including a screw that is configured to couple the second bracket to the body bracket attached to the cylinder member.

4. The kit of claim 3, wherein the first plate and the second plate both include rectangles with four corners and wherein the first plate is affixable to the second plate with four screws wherein each screw is disposed in a different one of the four corners so that if one of the four screws fails any remaining of the four screws will maintain a coupling between the second bracket and the connecting rod.

5. The kit of claim 1, wherein the second bracket includes an inverted Y-shaped structure that is coupled to a semi-circular structure with a pair of screws, the Y-shaped structure and the semi-circular structure defining an opening that is complementary in shape to the steering column when placed together, the Y-shaped structure including an extension that includes a screw for securing the second bracket to the body bracket attached to the cylinder member.

6. The kit of claim 1, wherein the connecting end of the linear steering stabilizer comprises a gimballed structure for attachment to the first bracket at a plurality of angles.

7. The kit of claim 1, wherein the body bracket of the linear steering stabilizer comprises a gimballed structure for attachment to the second bracket at a plurality of angles.

8. A three-wheel motorcycle with dual front wheels, comprising:
(a) a frame;
(b) a steering column and a connecting rod that couples the steering column to the dual front wheels;
(c) a linear steering stabilizer that includes a cylinder member and a piston rod, a portion of which fits slidingly in the cylinder member, in which the piston rod terminates in a connecting end, a body bracket being attached to the cylinder member;
(d) a first bracket that is affixed to the frame and that is affixed to the connecting end of the piston rod of the linear steering stabilizer; and
(e) a second bracket that is affixed to a selected one of the steering column or the connecting rod and that is affixed to the body bracket attached to the cylinder member,
wherein the linear steering stabilizer is configured to damp handlebar shake during operation of the three-wheel motorcycle.

9. The three-wheel motorcycle of claim 8, wherein the first bracket comprises a P-shaped member, the P-shaped member including a first elongated structure that is coupled to a second semi-circular structure with a pair of screws, the P-shaped member defining an opening that is complementary in shape to the frame therethrough, the first elongated structure terminating in an end that is configured to be coupled to the connecting end of the piston rod with a screw.

10. The three-wheel motorcycle of claim 8, wherein the second bracket comprises a first plate defining a first semi-cylindrical channel and an opposite second plate defining a second semi-cylindrical channel aligned with the first semi-cylindrical channel so that the first semi-cylindrical channel and the second semi-cylindrical channel form a cylindrical channel that is complementary in shape to the connecting rod when the first plate and the second plate are affixed to each other, the second bracket including a screw that is configured to couple the second bracket to the body bracket attached to the cylinder member.

11. The three-wheel motorcycle of claim 10, wherein the first plate and the second plate both include rectangles with four corners and wherein the first plate is affixable to the second plate with four screws wherein each screw is disposed in a different one of the four corners so that if one of the four screws fails any remaining of the four screws will maintain a coupling between the second bracket and the connecting rod.

12. The three-wheel motorcycle of claim 8, wherein the second bracket includes an inverted Y-shaped structure that is coupled to a semi-circular structure with a pair of screws, the Y-shaped structure and the semi-circular structure defining an opening that is complementary in shape to the steering column when placed together, the Y-shaped structure including an extension that includes a screw for securing the second bracket to the body bracket attached to the cylinder member.

13. The three-wheel motorcycle of claim 8, wherein the connecting end of the linear steering stabilizer comprises a gimballed structure for attachment to the first bracket at a plurality of angles.

14. The three-wheel motorcycle of claim 8, wherein the body bracket of the linear steering stabilizer comprises a gimballed structure for attachment to the second bracket at a plurality of angles.

15. A method of reducing handlebar shake in a three-wheel motorcycle with dual front wheels, having a frame, a steering column and a connecting rod that couples the steering column to the dual front wheels, comprising the steps of:
(a) affixing a first bracket to the frame;
(b) affixing a second bracket to a selected one of the steering column or the connecting rod;
(c) affixing the first bracket to a connecting end of a piston rod of a linear steering stabilizer; and
(d) affixing the second bracket to a body bracket attached to a cylinder member of the linear steering stabilizer, so that the linear steering stabilizer damps handlebar shake during operation of the three-wheel motorcycle.

16. The method of claim 15, wherein the first bracket comprises a P-shaped member, the P-shaped member including a first elongated structure that is coupled to a second semi-circular structure with a pair of screws, the P-shaped member defining an opening that is complementary in shape to the frame therethrough, the first elongated structure terminating in an end that is configured to be coupled to the connecting end of the piston rod with a screw.

17. The method of claim 15, wherein the second bracket comprises a first plate defining a first semi-cylindrical channel and an opposite second plate defining a second semi-cylindrical channel aligned with the first semi-cylindrical channel so that the first semi-cylindrical channel and the second semi-cylindrical channel form a cylindrical channel that is complementary in shape to the connecting rod when the first plate and the second plate are affixed to each other, the second bracket including a screw that is configured to couple the second bracket to the body bracket attached to the cylinder member.

18. The method of claim 17, wherein the first plate and the second plate both include rectangles with four corners and wherein the first plate is affixable to the second plate with four screws wherein each screw is disposed in a different one of the four corners so that if one of the four screws fails any remaining of the four screws will maintain a coupling between the second bracket and the connecting rod.

19. The method of claim 15, wherein the second bracket includes an inverted Y-shaped structure that is coupled to a semi-circular structure with a pair of screws, the Y-shaped structure and the semi-circular structure defining an opening that is complementary in shape to the steering column when placed together, the Y-shaped structure including an extension that includes a screw for securing the second bracket to the body bracket attached to the cylinder member.

20. The method of claim 15, wherein the connecting end of the linear steering stabilizer comprises a gimballed structure for attachment to the first bracket at a plurality of angles and wherein the body bracket of the linear steering stabilizer comprises a gimballed structure for attachment to the second bracket at a plurality of angles.

* * * * *